United States Patent [19]

Hindes

[11] Patent Number: 4,570,354
[45] Date of Patent: Feb. 18, 1986

[54] RADIUS OF CURVATURE TRANSDUCER
[75] Inventor: Charles S. Hindes, Poway, Calif.
[73] Assignee: Humphrey Inc., San Diego, Calif.
[21] Appl. No.: 637,547
[22] Filed: Aug. 3, 1984
[51] Int. Cl.[4] .............................................. G01B 7/28
[52] U.S. Cl. ................................. 33/534; 33/147 K; 33/542; 33/561; 33/143 L
[58] Field of Search ............. 33/143 C, 147 K, 174 R, 33/174 L, 175, 178 F, 15 P, 182, 542, 561, 534

[56] References Cited
U.S. PATENT DOCUMENTS

| | | | |
|---|---|---|---|
| 3,958,337 | 5/1976 | Anichini | 33/143 L |
| 3,983,631 | 10/1976 | Dutzler | 33/147 K |
| 4,178,692 | 12/1979 | Schultz | 33/143 L |
| 4,290,204 | 9/1981 | Possati | 33/143 L |

Primary Examiner—Willis Little
Attorney, Agent, or Firm—Henry M. Stanley

[57] ABSTRACT

A radius of curvature transducer has an integrally molded body, flexible in a bending mode with two contained wire guide tubes extending the length thereof, spaced laterally from and parallel to the body neutral axis and displaced 90° angularly about the neutral axis. A push-pull wire is fixed to one end of the body and extends freely through each wire guide. An LVDT sensor, having a movable core, is coupled to the free end of each push-pull wire. As the body is subjected to bending, the wires are displaced in the passages and in turn displace the moving member in the LVDT causing signal outputs indicative of the difference in length of the path along which the wire extends relative to the neutral axis. Calculations convert the signals to radius of curvature indications and indications of the coordinates of one end of the transducer body relative to the other end.

20 Claims, 7 Drawing Figures

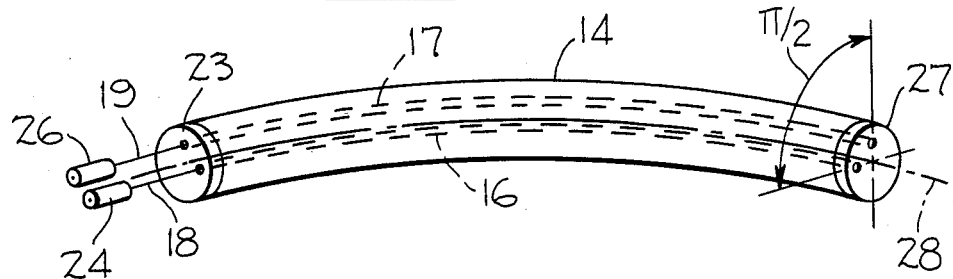
fig_2
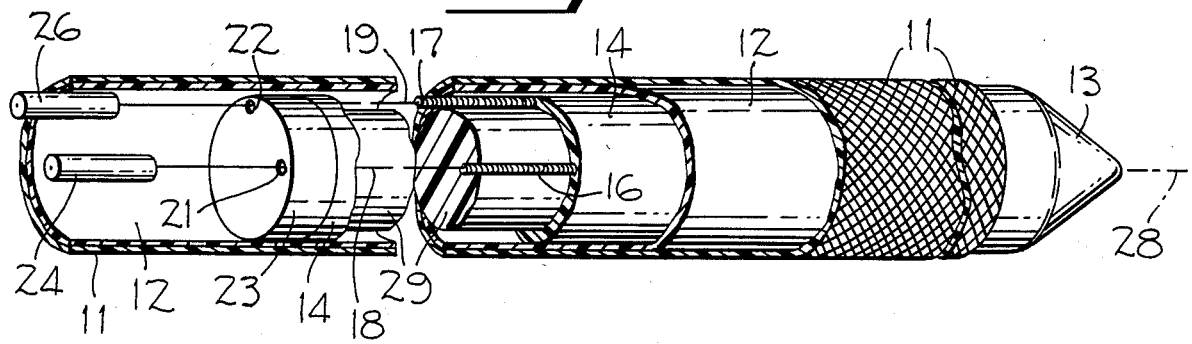
fig_1
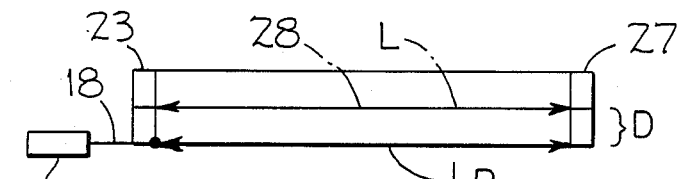
fig_3A
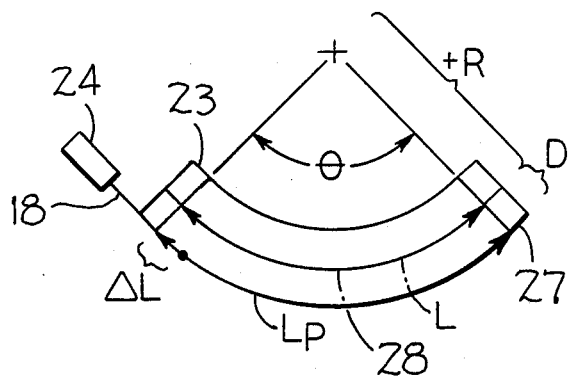
fig_3B
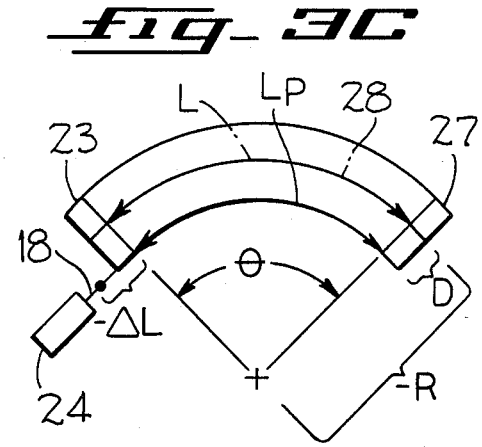
fig_3C

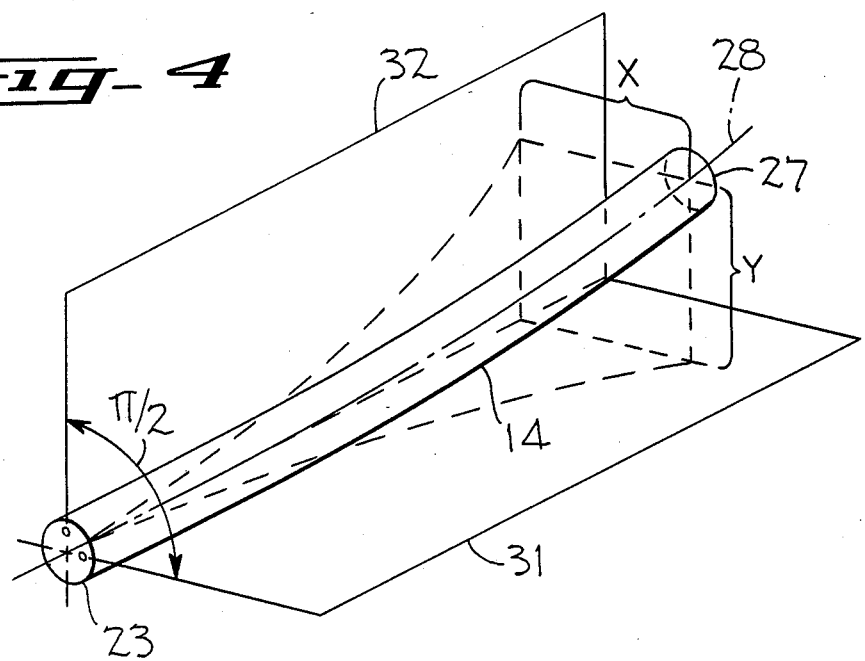
_fig_4_
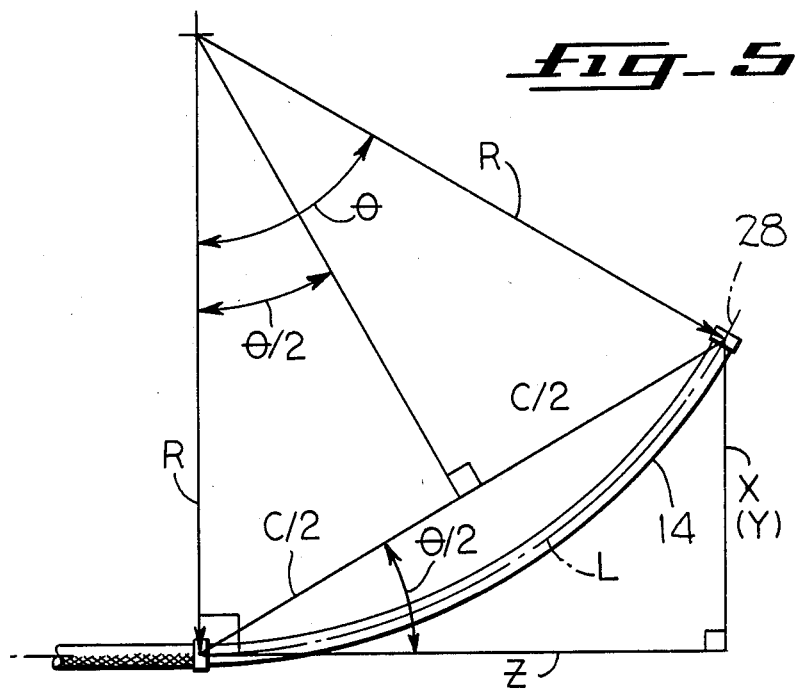
_fig_5_

RADIUS OF CURVATURE TRANSDUCER

BACKGROUND OF THE INVENTION

1. Field of the Invention

This invention relates to a transducer which provides indication of radius of curvature of a borehole in which it is disposed, and more particularly to a radius of curvature transducer which provides radius of curvature indication in two orthogonally oriented planes.

2. Description of the Prior Art

Previously attempts have been made to provide indication of radius of curvature within a subterranean borehole by using optical mirrors with rods extending therebetween, and positioning the mirrors so as to provide predetermined directions of reflected light therebetween. The relative angular orientation of the mirrors as measured provides data indicative of the radius of curvature of an arc extending between the mirrors.

SUMMARY OF THE INVENTION

A curvature transducer is disclosed herein which includes a transducer body flexible in a bending mode and having an elongate neutral axis of substantially constant length for excursions of the body in bending. A flexible elongate member is fixed at one end to the transducer body and is laterally spaced from the neutral axis. Means is provided for maintaining the elongate member at the laterally spaced position relative to the neutral axis and sensing means is coupled to the other end of the elongate member for sensing the translational movement of the other end relative to the transducer body during bending.

BRIEF DESCRIPTION OF THE DRAWINGS

FIG. 1 is a cutaway perspective view of the radius of curvature transducer of the present invention.

FIG. 2 is a diagrammatic perspective view of the radius of curvature transducer of the present invention.

FIG. 3A is a diagrammatic view of the transducer of the present invention in a nonbending mode.

FIG. 3B is a diagrammatic view of the transducer of the present invention in a positive bending mode.

FIG. 3C is a diagrammatic view of the transducer of the present invention in a negative bending mode.

FIG. 4 is a view of the transducer of the present invention illustrating curve detection in two orthogonal planes.

FIG. 5 is a diagram illustrating the derivation of the relationships used to compute displacement of the free end of the transducer of the present invention relative to the reference end thereof.

DESCRIPTION OF THE PREFERRED EMBODIMENT

A particular application for the radius of curvature transducer disclosed herein is in an instrument package utilized to measure the curvature of a borehole or pipe relative to some initial reference azimuth and elevation (starting points and reference directions in a horizontal and a vertical plane). The instrument package must therefore include attitude sensors, such as a three axis gravity sensing accelerometer package, and associated signal conditioning electronics together with the radius of curvature transducer so that the attitude of the detected radius of curvature in space may be properly oriented. The instrument package including the radius of curvature transducer is forced through the borehole or subterranean pipe by means of a flexible rod, hydraulic pressure, or any other appropriate means. The distance along the borehole may be recorded by monitoring the length of a payout cable attached to the instrument package. Data from the gravity sensing package, the curvature transducer and the cable length monitor is used together with the initial azimuth of the transducer and initial hole direction to plot the position or the path of the borehole in the horizontal and vertical planes. Thus, the three dimensional path of a borehole may be determined (and plotted in local horizontal and vertical planes) by either stepwise extraction of data indicative of the location of the free end of the radius of curvature transducer relative to the fixed or reference end at each length L of travel along the borehole, or by continuous sensing of the radius of curvature (and therefore the position of the curvature transducer free end) and the distance that the curvature transducer has traveled through the borehole. In both instances, attitude data for the curvature transducer relative to an initial reference framework is required as hereinbefore recited.

The curvature transducer has a tubular shape and is flexible in a bending mode to enable the curvature transducer and the remainder of the entire instrument package to conform to the shortest radius of curvature expected in the borehole or subterranean pipe to be surveyed. As may be seen by reference to FIG. 1 of the drawings, an outer strength layer of woven Kevlar* is layed over the entire instrument package. A sealed polyurethane tube 12 is enclosed by the outer Kevlar wear layer, which serves to isolate the interior of the instrument package and the curvature transducer from surrounding environments. The polyurethane tubing is sealed at each end by a stainless steel fitting, one of which is shown at 13. The opposite end of the tube is sealed by a similar fitting (not shown) through which the various signal conductors extend and to which the contact or payout cable (not shown) is attached. That portion of the sealed tubing extending to the left of the curvature transducer as shown in FIG. 1 contains the aforementioned attitude sensors and signal conditioning electronics (not shown).
*Trademark Enclosed within the polyurethane sealed tubing 12 is found a molded body structure 14, also flexible in bending mode, which may also be of a polyurethane material. The molded body 14 includes wire guides 16 and 17 which are preferably molded into the body 14 and which provide passages along the length of the body through which push-pull wires 18 and 19 are extended respectively. The push-pull wires extend through clearance passsages 21 and 22 respectively in an end bulkhead 23 which is fixed to the end of the molded body 14. A free end of each of the push-pull wires 18 and 19 is coupled to an LVDT, 24 and 26 respectively, which provide signal outputs indicative of the translation of the push-pull wires in their respective passages. The LVDTs 24 and 26 are in fixed position within the instrument package relative to the end bulkhead 23.

As may be seen by reference to FIG. 2, the radius of curvature transducer is shown with the molded body 14 extending between the end bulkhead 23 and another end bulkhead 27 at the opposite end of the molded body. One end of each of the push-pull wires 18 and 19 is fixed in the end bulkhead 27. It should be noted that although FIGS. 1 and 2 show the LVDTs 24 and 26 at one end of the transducer body and the push-pull wires 18 and 19 fixed at the other end thereof, one LVDT could be placed at each end of the transducer body and the opposite end of the push-pull wire coupled thereto could be fixed in the end bulkhead attached to the opposing end of the transducer body. It should also be noted that although FIGS. 1 and 2 show LVDT's 24 and 26 as the linear displacement sensors, other devices such as linear potentiometers will perform the identical function. The passages represented by the guide tubes 16 and 17 are shown displaced radially (or laterally) from a neutral or reference axis 28 extending through the body of the curvature transducer. The reference axis 28 is of substantially constant length as the body undergoes bending. The passages 16 and 17 are shown displaced angularly about the reference axis 28 by $\pi/2$ radians or 90°. To maintain the passages and therefore the push-pull wires in a single plane from one end of the curvature transducer to the other, a torsionally stiff anti-torque tube 29 (FIG. 1) is fixed to each of the end bulkheads 23 and 27, extending the length of the transducer body therebetween. Thus, the transducer body may be perceived as including the molded body 14 with the passages 16 and 17 passing therethrough, the end bulkheads 23 and 27, the anti-torque tube 29 extending between the end bulkheads and the surrounding sealed tubing 12.

The simplified diagrammatic drawings of 3A, 3B and 3C are used to illustrate the manner in which the curvature transducer provides a signal indicative of curvature in one plane. In FIG. 3A the neutral or reference axis 28 is seen to extend through the curvature transducer in a location such that when the transducer body is subjected to bending modes the length of the reference axis remains substantially constant as mentioned hereinbefore. The push-pull wire 18 extends through the passage 16 spaced from the reference axis by a distance D and running substantially parallel thereto. When the transducer body is not being subjected to a bending mode, the length of the path $L_P$ through the passage 16 is substantially the same as the length of the reference axis 28, also indicated by L in FIG. 3A. Radius of curvature is infinite in this instance and the output from the LVDT 24 is indicative of this condition.

For the sake of convention, the curvature condition illustrated in FIG. 3B is designed as positive curvature. It may be seen that the length of the path $L_P$ has increased from the length L by the amount $\Delta L$.

$$L_P = L + \Delta L$$

In keeping with the aforementioned convention, the curvature condition illustrated in FIG. 3C is designated negative curvature. It may there be seen that the length of the path $L_P$ is now shorter than the reference axis L by an amount $\Delta L$.

$$L_P = L - \Delta L$$

The $\Delta L$ and $-\Delta L$ translations of the push-pull wire 18 are indicated by the output from the LVDT 24 relative to the output in the zero bending mode of FIG. 3A. The foregoing illustrates how a signal is generated which is indicative of the instantaneous radius of curvature of the transducer body, and therefore the borehole or pipe, wherein the assumption is made that the radius of curvature transducer body in bending subscribes a portion of a circular arc.

The manner in which the radius of curvature and other data of interest is computed by using the signal outputs from the curvature transducer will now be described. The approach begins with the basic relationship $L = R\theta$; where L is the length of the neutral axis 28, R is the radius of curvature, and $\theta$ is the angle in radians subtended by the arc of length L.

The following relationships are obtained with reference to the symbols in FIGS. 3A, 3B and 3C:

$$\theta = \frac{L}{R} \quad \text{(EQN. 1)}$$

POSITIVE CURVATURE (FIG. 3B)

$$R + D = \frac{L + \Delta L}{\theta}$$

$$\theta = \frac{L + \Delta L}{R + D} \quad \text{(EQN. 2)}$$

$$\frac{L}{R} = \frac{L + \Delta L}{R + D}$$

$$R = \frac{LD}{\Delta L} \quad \text{(EQN. 3)}$$

NEGATIVE CURVATURE (FIG. 3C)

$$R - D = \frac{L - \Delta L}{\theta}$$

$$\theta = \frac{L - \Delta L}{R - D} \quad \text{(EQN. 4)}$$

$$\frac{L}{R} = \frac{L - \Delta L}{R - D}$$

$$R = \frac{LD}{\Delta L} \quad \text{(WHICH IS EQN. 3)}$$

In the foregoing it may be seen by reference to FIGS. 3A, 3B and 3C that D is the radial distance between the neutral axis 28 (or L) and the path of the control wire 18 (or $L_P$). The distances L and D are fixed structurally and the distance $\Delta L$ is indicated by the output from the LVDT 24.

FIGS. 4 and 5 are utilized to illustrate the manner in which the displacement of the free end of the curvature transducer 14 is measured with respect to the reference end thereof, in this instance the end at which the end bulkhead 23 is located. Planes 31 and 32 are oriented orthogonally with the fixed end of the transducer body tangent to each of the orthogonal planes. The free end of the transducer body is therefore located by X, Y and Z coordinates relative to the fixed end. The displacements X and Y are calculated in similar fashion. The calculation of X is undertaken with reference to FIG. 5.

R IS COMPUTED FROM EQN. 3

L IS KNOWN $$\theta = \frac{L}{R}$$

$$C = 2R \sin \frac{\theta}{2}$$

$$X = C \sin \frac{\theta}{2}$$

$$Z = C \cos \frac{\theta}{2}$$

In summary, R is computed from known L and D, and measured $\Delta L$. $\theta$ is calculated from known L and computed R. The cord C is computed from calculated R and θ. The coordinates X, Y and Z of the free end of the transducer body are calculated from the computed values of C and θ.

Although the best mode contemplated for carrying out the present invention has been herein shown and described, it will be apparent that modification and variation may be made without departing from what is regarded to be the subject matter of the invention.

What is claimed is:

1. A curvature transducer, comprising
   a transducer body flexible in a bending mode and having an elongate neutral axis of substantially constant length in said bending mode,
   a flexible elongate member fixed at one end thereof to said body and laterally spaced from said neutral axis,
   means for maintaining said elongate member at said laterally spaced position relative to said neutral axis during all modes of bending, and
   sensing means coupled to the other end of said elongate member for sensing the translational movement of said other end relative to said transducer body.

2. A curvature transducer as in claim 1 wherein said flexible elongate member comprises
   first and second elongate members displaced by a predetermined angle about said neutral axis, and
   wherein said sensing means comprises first and second signal generators coupled to the other ends of said first and second elongate members respectively, whereby curvature of said body may be monitored in two planes displaced by said predetermined angle.

3. A curvature transducer as in claim 2 wherein said predetermined angle is a right angle, whereby said two planes are in orthogonal relationship.

4. A curvature transducer as in claim 1 wherein said means for maintaining comprises a guide tube, said guide tube surrounding said member and extending through said body in substantially parallel relation with said neutral axis.

5. A curvature transducer as in claim 1 wherein said means for maintaining comprises said transducer body having a channel extending therethrough in loose surrounding relationship with said elongate member and in substantially parallel spaced relation with said neutral axis.

6. A curvature transducer as in claim 1 wherein said transducer body comprises means for preventing rotational displacement between the ends thereof.

7. A curvature transducer as in claim 1 wherein said transducer body comprises a sealed container isolating said elongate member and sensing means from surrounding environments.

8. A curvature transducer as in claim 7 wherein said sealed container contains a dielectric fluid, whereby said transducer body is resistant to external pressure.

9. A curvature transducer, comprising
   a transducer body having an elongate reference axis of substantially constant length when said body is subjected to bending,
   said body having an elongate passage extending therethrough displaced from and parallel to said reference axis,
   a flexible elongate member fixed at one end thereof to said body and extending through and being axially movable within said passage along the length thereof which is spaced from said fixed end when said body is bent,
   sensing means coupled to the other end of said elongate member for sensing the distance through which the free end of said elongate member moves during bending of said body.

10. A curvature transducer as in claim 9 wherein said elongate passage comprises a guide tube embedded in said transducer body and surrounding said flexible elongate member.

11. A curvature transducer as in claim 9 wherein said flexible elongate member comprises first and second elongate members displaced by a predetermined angle about said reference axis, and wherein said sensing means comprises first and second linear displacement sensors coupled to said first and second members respectively, whereby curvature of said transducer body in two planes separated by said predetermined angle may be monitored.

12. A curvature transducer as in claim 11 wherein said predetermined angle is a right angle and said two planes are orthogonally disposed.

13. A curvature transducer as in claim 9 wherein said transducer body comprises means for preventing rotational displacement between the ends thereof.

14. A curvature transducer as in claim 9 wherein said transducer body comprises a sealed container enclosing said passage, elongate member and sensing means, thereby isolating them from surrounding environments.

15. A curvature transducer as is in claim 14 wherein said sealed container contains a dielectric fluid, whereby said transducer body is resistant to external pressure.

16. A radius of curvature transducer comprising
    a transducer body having a neutral axis substantially constant in length as the body is flexed in a bending mode,
    said body having first and second passages therethrough spaced from and extending substantially parallel to said neutral axis, said passages being separated angularly about said neutral axis by a right angle,
    first and second elongate members flexible in bending extending through said first and second passages respectively, one end of each of said first and second members being fixed to said transducer body, whereby the free ends thereof are movable translationally within said passages during body bending,
    first and second sensor means coupled to said free ends of said first and second elongate members respectively, whereby signals indicative of radius of curvature of said transducer body in two orthogonally disposed planes are obtained, and
    means disposed between the ends of said transducer body for substantially preventing rotational movement therebetween.

17. A radius of curvature transducer as in claim 16 wherein said transducer body comprises a sealed container isolating said passages, elongate members and sensor means from the surrounding environment.

18. A radius of curvature transducer as in claim 17 wherein said transducer body includes a dielectric fluid, whereby said transducer body is resistant to external pressures.

19. A radius of curvature transducer as in claim 16 wherein said body, passages, and means for preventing rotational movement comprise integral molded construction.

20. A radius of curvature transducer as in claim 16 wherein said first and second passages comprise first and second guide tubes surrounding said first and second elongate members respectively.

* * * * *